March 24, 1959   HANS-JOACHIM NOWACKI ET AL   2,879,158
METHOD FOR THE SEPARATION OF IMPURITIES FROM
COBALT-CONTAINING MATERIALS
Filed April 5, 1955
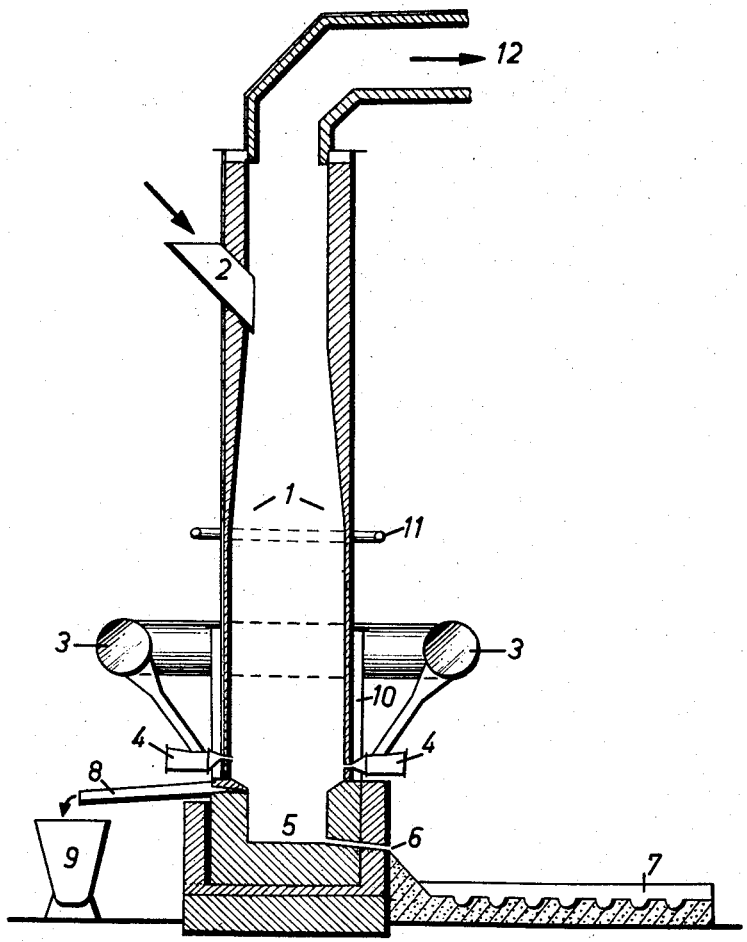
HANS-JOACHIM NOWACKI, HEINRICH SCHACKMANN, WILHELM TEWORTE,   INVENTORS
PETER VOSSEL
BY Burgess, Dinklage + Sprung
ATTORNEYS

United States Patent Office 2,879,158
Patented Mar. 24, 1959

2,879,158

METHOD FOR THE SEPARATION OF IMPURITIES FROM COBALT-CONTAINING MATERIALS

Hans-Joachim Nowacki, Heinrich Schackmann, Wilhelm Teworte, and Peter Vossel, Duisburg, Germany, assignors to Duisburger Kupferhutte, Duisburg, Germany, a corporation of Germany Application April 5, 1955, Serial No. 499,426

Claims priority, application Germany April 8, 1954

4 Claims. (Cl. 75—82)

This invention relates to improvements in the separation of impurities from cobalt-containing materials.

It is well known that metallic cobalt and cobalt-containing alloys cannot be directly recovered from ores by means of smelting, since the ore has only a small concentration of cobalt and always contains a more or less large number of additional metallic elements.

The conventional working up of the cobalt-containing ores into intermediate products richer in cobalt and into commercial quality metal requires relatively elaborate and troublesome treatment steps. Thus, for example, a mixed oxide obtained in the treatment of pyrite cinders which contains cobalt, zinc, manganese and iron oxides conventionally requires at least five separate treatment steps in the electric arc furnace alone. These steps include the volatilization of the zinc during the reducing smelting; the blowing of the manganese-containing crude cobalt; the removal of the manganese by means of the raking off of the manganese slag; the removal of the iron by oxidizing the molten crude metal with the aid of air; the desulfurization by adding lime and carbon to the crude metal melt; and the removal of carbon by oxidizing the crude metal with oxygen or air.

In the conventional treatment methods the numerous treatment steps require the raking off of the slag, are relatively expensive, and result in high cobalt losses.

In industry, cobalt is predominantly used as an alloying element and is seldom used as a pure metal. The working up and recovery of cobalt from cobalt-containing scrap, waste metals, slags, flue dusts, grinding powders, and other residues of various treatment steps therefore involve the same difficulties as outlined above. These materials may be separated into the various metallic components by chemical treatment with highly corrosive acids, chlorine or the like to form metallic salt solutions from which the individual alloying elements may be obtained by means of subsequent precipitation. This chemical treatment is, however, relatively complicated and expensive.

One object of this invention is a process for the treatment of impure cobalt materials containing other metallic components which allows a decrease in the large number of purification steps conventionally required. This, and still further objects will become apparent from the following description:

In accordance with the invention the impure cobalt-containing material is subjected to a reducing treatment in a furnace as, for example, a shaft furnace. The reducing treatment may be effected by blowing an oxygen-containing gas such as air or oxygen-enriched air through the molten material in the presence of a carbonaceous reducing agent such as coke.

Very surprisingly, this reducing treatment effects a good separation of certain of the elements contained in the starting material, leaving the cobalt in the form of a molten crude metal which may be refined in the conventional manner.

The reducing treatment separates from the cobalt metal or cobalt alloy as, for example, a nickel iron cobalt alloy, the constituents capable of being converted into slag as, for example, aluminum, silicon, magnesium, manganese, titanium and chromium by forming a molten slag containing these elements while at the same time the easily volatilized elements such as zinc and cadmium are separated by being volatilized. The molten slag and molten metal which are formed may very easily be separately discharged from the furnace as, for example, from the shaft furnace in continuous operation.

Depending upon the type of starting material charged, the slag and flue dust may be further utilized as, for example, in the production of ferromanganese and, in the case of zinc oxides, for the recovery of zinc.

Examples of cobalt-containing starting materials which may be treated in accordance with the invention include, among others, cobalt-containing oxides, alloy steels, hard metal or alloys, permanent magnet alloys, stainless heat-resisting steels, abrasion and corrosion resistant alloys, cobalt-containing waste metals, and slag and flue dust which are obtained during the smelting of the cobalt-containing materials mentioned above.

The exact reaction conditions under which the reducing treatment in accordance with the invention may be effected and the exact manner in which the slagging is effected may be varied within wide limits, depending upon the composition of the starting material containing the impure cobalt. Thus, for example, the blowing through of the oxygen-containing gas may be effected with cold or hot gas having temperatures up to 900° C.

The oxygen-containing gas may have an oxygen content ranging from that of air up to pure oxygen gas.

An addition of 0.3–1 part by weight of carbonaceous materials per part by weight of starting material is generally sufficient for the reduction of the metal. The amount of the carbonaceous material required for the smelting of the burden is entirely dependent upon the composition and the smelting temperature of the material charged. In the case of residues having a low metal content, amounts as high as 5 parts by weight based on the material charge and more may be required.

Furthermore, the process in accordance with the invention may be adapted to produce a crude metal having a composition suitable for the subsequent finishing refinement in conventional electric furnaces or in gas-fired furnaces. If, for example, the crude metal may contain iron, the use of smelting coke will suffice for the reduction and heat production. If, on the other hand, the crude metal can only have a relatively low iron content, or if the iron content is to be even lower than that of the starting material, there may be used low-ash coke or coke poor in iron as, for example, Baesweiler coke from the Aachen coal mining district in West Germany. Additionally, charcoal may be exclusively used for the reduction if the required heat is supplied by electric heating or gas heating. With the use of a well known burden calculation, as is conventionally used with other metallurgical processes, the composition of the slag may be so controlled that desulfurization is effected to a large extent and so that no separate refining of the crude metal for the purpose of the removal of sulfur is required. Even, however, in cases where such refining for the removal of sulfur is required, the same need only be effected for very short duration.

The invention is also applicable for treating cobalt-containing residues of metal as, for example, scrap, slag, flue dust, grinding powder, waste metals, etc. For this purpose, it is preferable that the residue from a given alloy be separately treated and that the residues of various different types of alloys are not mixed together for the treatment. When operating in this manner, the crude metal obtained by the treatment in accordance with the invention may be refined so that there is obtained a cobalt-containing metal which additionally contains other constituents as, for example, nickel, molybdenum, tungsten and iron. By the replacement of the alloying elements which are removed by the smelting reducing treatment in accordance with the invention as, for example, aluminum or chromium, the metal may be obtained in the form of the composition of the original alloy.

From the point of view of economy, this manner of utilizing the residues constitutes a substantial advance in the art over the conventional, troublesome working up of these residues into the individual alloying constituents, which requires several chemical and/or smelting treatment steps and is accompanied by high costs and high metal losses. The treatment in accordance with the invention is particularly well suited for the treatment of cobalt-containing residues of corrosion-resistant metals as, for example, high grade steel or similar metallic substances which resist chemical treatment as, for example, with acids and which can only be dissolved under extreme oxidizing conditions.

The process in accordance with the invention is, however, also of advantage for the recovery of the individual metal components themselves and in particular the cobalt and other metals such as molybdenum and nickel in pure form. For this purpose, the process represents only an intermediate step for the recovery of the metal. By means of the smelting reduction process, there will be removed elements such as aluminum and silicon which are unfavorable to the subsequent separation of the individual metal components as, for example, by the hydrometallurgical separation process. The metal obtained in accordance with the invention may be rendered into a form which is particularly suited for the hydrometallurgical process as, for example, by means of granulation, or atomization.

The atomization may also be effected with the aid of air or oxygen so that metal oxides that readily lend themselves to the dissolution in acids are formed to a great extent. The hydrometallurgical working up of the metal salts present in the solution is effected in the conventional manner.

The process is particularly suitable for the working up of scrap which contains additional impurities.

The process in accordance with the invention may be used for working up slags and waste materials for the ultimate formation of a cobalt metal with a cobalt content of 97–99.7% by the subsequent finishing refinement treatment.

The process in accordance with the invention may suitably be effected in a cylindrical shaft furnace as shown in the accompanying drawing. Referring to the drawing, the cylindrical shaft furnace 1 is charged with the starting cobalt-containing material and the carbonaceous fuel through the feed opening 2. The hot or cold blast air is blown into the furnace by passage from the blast conduits 3 through the jets 4. The carbonaceous material such as the smelting coke is burnt and reduces the heavy metal contained in the charge. The reduction is effected either directly or indirectly through the formation of carbon monoxide. The cobalt-containing metal is collected in the hearth 5 and is from time to time discharged through the discharge tap 6 into the pouring bed 7. The molten slag is discharged through the slag tap 8 into a pouring ladle 9. The lower portion 10 of the outer casing of the shaft furnace is cooled with water. Moreover, a spray pipe 11 provides for the cooling of the shaft. The exit gases from the process are passed through the upper portion of the shaft into the discharge pipe 12 from where they are conducted into a dust chamber for the precipitation of the flue dust.

The following examples are given by way of illustration and not limitation:

Example 1

A slag containing 20.6% MnO, 13.3% CoO, 2.3% FeO, 3.4% ZnO, 25.8% $SiO_2$, and 31.4% CaO+MgO, obtained in the reduction of a cobalt-containing, manganese-containing, and zinc-containing mixed oxide in an electric arc furnace, is converted to crude metal and slag by means of blowing air preheated to 400° C. in a shaft furnace employing an amount of smelting coke containing 0.7% Fe equal in weight percent to the slag charged. The crude metal contains 82.3% Co, 12.4% Fe, 0.30% S, 1.5% C, 0.8% Mn, and 0% Zn. The shaft furnace slag contains 0.14% CoO, 1.40% FeO, 20.1% MnO in addition to 25.5% CaO, 9.2% MgO, 31.45% $SiO_2$, and 8.83% $Al_2O_3$. A small amount of flue dust containing 25.4% ZnO, 5.3% MnO, and 2.7% CaO, is separated from the waste gases on said waste gases being cooled in a bag filter apparatus. In a conventional manner, the crude metal is refined in an electric furnace and obtained in the form of cobalt rich in iron, containing 86.4% Co, 12.9% Fe, 0.02% C and S each, and 0% Mn.

Example 2

A cobalt oxide mixed with other metal oxides, the composition of which is:

| | |
|---|---|
| 44.3% CoO | 1.6% MgO |
| 11.2% ZnO | 0.2% $SiO_2$ |
| 12.2% MnO | 1.6% $Al_2O_3$ |
| 1.6% FeO | 2.2% S |
| 8.5% CaO | 3.8% Cl | is obtained in the working up of the final solutions of the chloridizing roasting of pyrites cinders. It is then blown in a shaft furnace with 1½ times the amount of charged oxides of low-ash Baesweiler coke i. e., 40% of the charge being oxide and 60% coke and cold-air blast, iron-free quartz sand being added. The crude metal, which is obtained, contains 93.8% Co, 0.50% Mn, 3.4% Fe, 0.6% C, and 0.35% S, and it may be worked up into a cobalt metal containing 97–99% Co, by means of short-duration refinement in an electric furnace. The cobalt content of the shaft furnace slag amounts to 0.5%. The flue dust contains 63% ZnO and may be worked up into zinc or zinc compounds.

Example 3

A waste metal containing:

| | |
|---|---|
| 12.1% Co | 5.5% Al |
| 29.8% Fe | 2.8% Cu |
| 14.1% Ni | 0.1% S |

Remainder: slag-forming constituents $SiO_2$, CaO, $Al_2O_3$ is obtained in the production of permanent magnets. It is then blown in a shaft furnace with an equal amount in weight percent of smelting coke and cold-air blast, the shaft furnace slag of Example 1 being added. The crude metal, which is obtained, contains:

| | |
|---|---|
| 20.3% Co | 4.6% Cu |
| 52.9% Fe | 0.1% S |
| 23.4% Ni | 0.9% C |
| 0.7% Al | |

In a short-duration refining process in an electric furnace, it is worked up into an alloy containing

| | |
|---|---|
| 19.9% Co | 4.5% Cu |
| 52.1% Fe | 0.02% S |
| 23.0% Ni | 0.02% C |
| –% Al | | which alloy is used again for the production of the permanent magnet alloy.

Example 4

A mixed oxide, the composition of which

| | |
|---|---|
| 52.3% CoO | 1.5% MgO |
| 8.3% ZnO | 0.3% $SiO_2$ |
| 11.7% MnO | 0.6% S |
| 0.8% FeO | 2.0% Cl |
| 7.5% CaO | | is blown with one-fifth of the amount of mixed oxides of charcoal and an addition of iron-free quartz sand in a furnace, a cold-air blast enriched in oxygen up to 40% $O_2$, being introduced. In keeping with the standard practice with regard to the electric furnaces described in the technical literature, the furnace is supplied with additional electric heating.

A crude metal containing:

| | |
|---|---|
| 95.2% Co | —% Zn |
| 1.4% Fe | 0.8% C |
| 0.3% Mn | 0.4% S | is obtained in molten state, which crude metal is worked up into a commercial metal, which contains 98–99% Co, by means of conventional refinement. The flue dust contains 68% ZnO and is utilized in the known manner.

Example 5

The alloy obtained according to Example 3, having a composition of:

| | |
|---|---|
| 20.3% Co | 4.6% Cu |
| 52.9% Fe | 0.1% S |
| 23.4% Ni | 0.9% C |
| 0.7% Al | | is subjected to granulation in water and dissolved with the aid of HCl and $Cl_2$. The copper is separately obtained from the solution by means of cementation with iron. Subsequently, the iron is oxidized to a ferric iron compound with the aid of atmospheric oxygen and chlorine and precipitated with the aid of lime at pH-values of 2.8–3.5. The iron slurry is separated and subsequently, the cobalt and the nickel are separately recovered. The separation of the cobalt and the nickel is so effected that the cobalt is precipitated in the form of a trivalent compound at pH-values of 3.0–4.0 with the aid of lime, chlorine being used as the oxidizing agent. The cobalt slurry obtained is worked up to a pure cobalt metal of over 99% Co. If need be, the said working up is preceded by another precipitation. The nickel remaining in the solution is precipitated at pH-values of 4.5–6.5 by means of lime. If need be, another precipitation is effected also in this case, subsequent to which the working up to pure nickel is carried out according to the known processes.

We claim:

1. Process for the reducing treatment of impure cobalt-containing materials such as mixed oxides of cobalt and other metallic elements and cobalt-containing metal alloy residues which comprises maintaining said impure cobalt-containing material in substantially molten form while blowing an oxygen-containing gas therethrough in the presence of a carbonaceous reducing agent, maintaining a reducing medium, removing the readily volatilizable components and forming a crude, cobalt-containing molten metal and a molten slag containing the material capable of being readily slagged in which said treatment is effected in a shaft furnace, and recovering the crude cobalt-containing metal.

2. Process according to claim 1, in which said carbonaceous material is selected from the group consisting of smelting coke, low-ash coke and charcoal.

3. Process according to claim 1, in which said carbonaceous material is poor in iron and which includes supplying additional heat to the material.

4. Process according to claim 1, in which said impure cobalt-containing material is a cobalt-containing metal alloy residue.

References Cited in the file of this patent

UNITED STATES PATENTS

| | | |
|---|---|---|
| 210,020 | Garnier | Nov. 19, 1878 |
| 399,009 | Brandreth | Mar. 5, 1889 |
| 1,526,910 | Job | Feb. 17, 1925 |
| 1,717,160 | Kichline | June 11, 1929 |
| 1,941,506 | Witter | Jan. 2, 1934 |
| 2,740,710 | Johannsen | Apr. 3, 1956 |

FOREIGN PATENTS

| | | |
|---|---|---|
| 124,014 | Australia | Apr. 24, 1947 |
| 17,410 | Great Britain | 1888 |